United States Patent [19]
Podesta
[11] 4,158,416
[45] Jun. 19, 1979

[54] SYSTEM FOR HANDLING CONTAINER CARGO AND A NOVEL SHIP AND LIFTING DEVICE

[75] Inventor: Sergio Podesta, Genoa, Italy
[73] Assignee: Container Cargo Carriers Corporation, Lausanne, Switzerland

[21] Appl. No.: 853,257
[22] Filed: Nov. 21, 1977

Related U.S. Application Data

[63] Continuation of Ser. No. 682,981, May 4, 1976, abandoned.

[30] Foreign Application Priority Data

May 27, 1975 [IT] Italy ................ 1264 A/75

[51] Int. Cl.² ................ B66F 9/18; B65G 63/00; B66C 1/66
[52] U.S. Cl. ................ 414/139; 114/72; 212/11; 294/81 SF; 414/626
[58] Field of Search ................ 214/12, 14, 15 R, 75 R, 214/75 G, 658, 75 H; 114/72; 294/81 SF, 81 R; 212/14, 18, 20, 21, 125, 135, 15, 11

[56] References Cited

U.S. PATENT DOCUMENTS

| | | | |
|---|---|---|---|
| 1,522,707 | 1/1925 | Andrews | 214/152 |
| 1,685,724 | 9/1928 | Rosenthal | 212/11 |
| 2,451,198 | 10/1948 | Burke | 214/14 |
| 2,672,840 | 3/1954 | Sharp | 114/70 |
| 2,760,661 | 8/1956 | Wright | 214/620 |
| 3,294,262 | 12/1966 | Person | 214/620 |
| 3,412,876 | 11/1968 | Calabrese | 214/14 |
| 3,460,686 | 8/1969 | Cole | 214/14 |
| 3,514,146 | 5/1970 | Zweifel | 294/81 SF X |
| 3,586,183 | 6/1971 | Shaffer | 214/75 G |
| 3,589,540 | 6/1971 | Kinross | 214/621 |
| 3,591,023 | 7/1971 | Allen | 214/14 |
| 3,598,440 | 8/1971 | Ramsden | 294/67 |
| 3,684,114 | 8/1972 | Cosgrove | 214/654 |
| 3,688,933 | 9/1972 | Rumell | 214/621 |
| 3,759,409 | 9/1973 | Wenzel | 212/11 X |
| 3,764,032 | 10/1973 | Ward | 214/621 |
| 3,789,998 | 2/1974 | Fathaver | 294/81 SF X |
| 3,818,852 | 6/1974 | Lewis | 214/12 X |
| 3,833,140 | 9/1974 | Young | 214/81 SF X |

FOREIGN PATENT DOCUMENTS

| | | | |
|---|---|---|---|
| 96909 | 4/1973 | German Democratic Rep. | 214/14 |
| 1014691 | 12/1965 | United Kingdom | 114/72 |

*Primary Examiner*—Robert G. Sheridan
*Assistant Examiner*—George F. Abraham
*Attorney, Agent, or Firm*—Brumbaugh, Graves, Donohue & Raymond

[57] ABSTRACT

A container cargo handling system for loading and unloading ships includes an improved transport vehicle having cable-operated collecting means for lowering and raising container cargo in the ship's hold from the main deck and a cargo vessel having vertical storage compartments with hatchways on the main deck covered by pontoon covers which form a roadway for the transport vehicle, and a bow entrance for direct passage of the transport vehicle onto the main deck for loading and unloading the vessel.

7 Claims, 12 Drawing Figures

FIG. 6
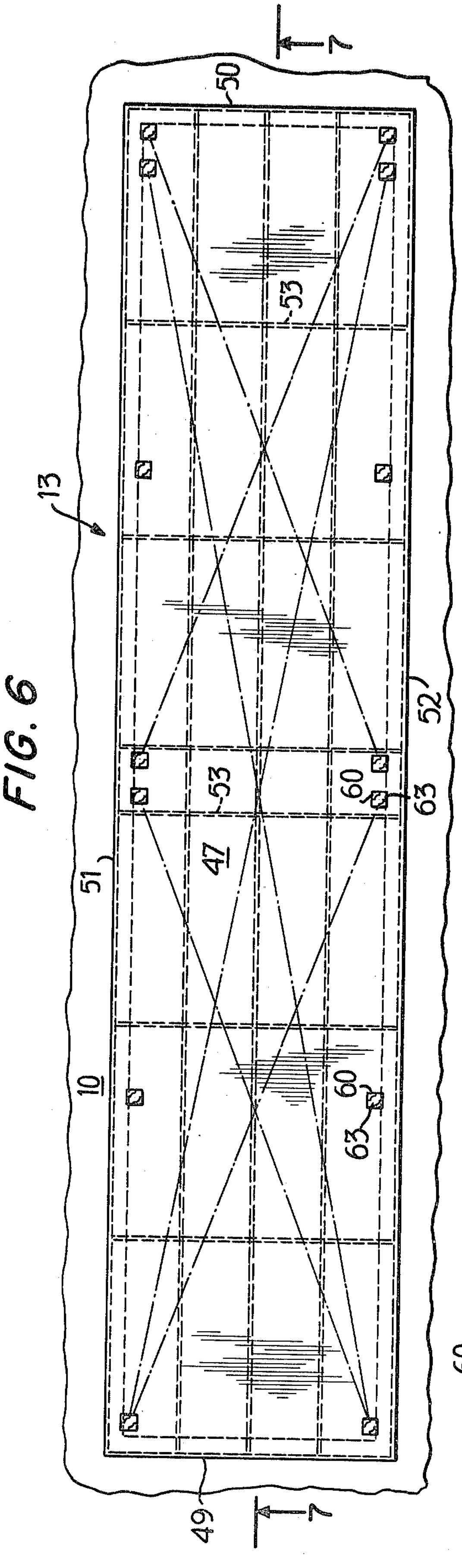
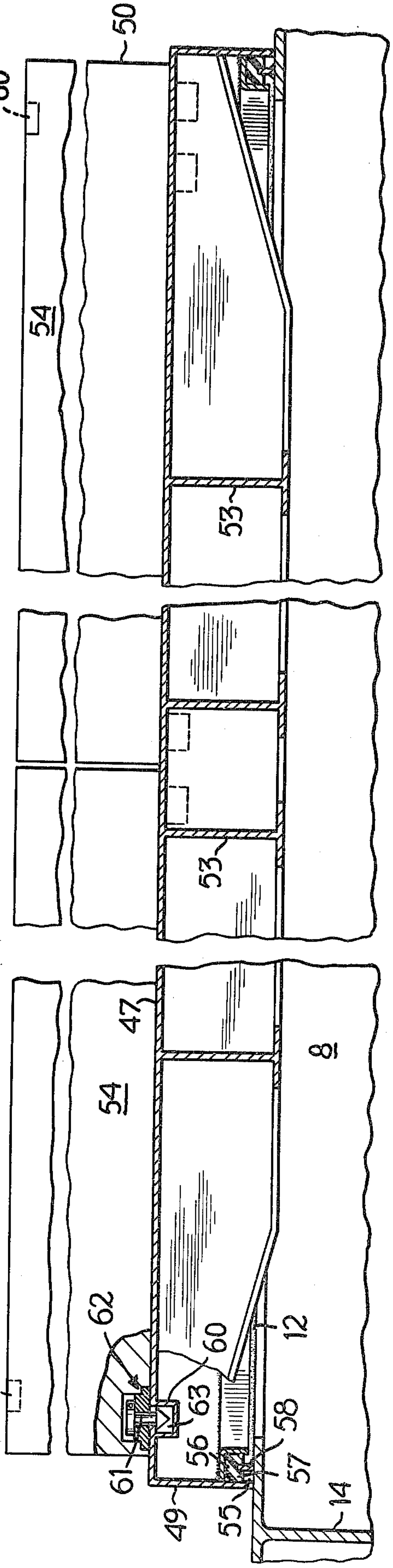
FIG. 7

SYSTEM FOR HANDLING CONTAINER CARGO AND A NOVEL SHIP AND LIFTING DEVICE

This is a continuation, of application Ser. No. 682,981 filed May 4, 1976, and abandoned.

BACKGROUND OF THE INVENTION

1. Field of the Invention

The field of the invention pertains broadly to improvements in marine cargo transport and handling systems. More particularly, this invention relates to a system for efficient and expeditious handling of containerized cargo in a vessel having vertical storage compartments using a cargo transport vehicle having an improved collecting means for lowering and raising containers in the ship's hold from the main deck. The cargo vessel has an entrance way in the bow section to allow passage of the transport vehicle on and off the main deck for loading and unloading the cargo.

2. Description of the Prior Art

There are a variety of marine cargo handling systems which are used conventionally for ships having vertical storage compartments. These systems use either a movable or stationary crane, or other lifting device, on the dock in the harbor, or a crane mounted on a gantry which moves on tracks over the main deck of the ship. The systems requiring a harbor crane capable of being operated between the dock and the deck of the ship are costly from several viewpoints. Special and precise handling are required to ensure the proper alignment of the container carried by the crane with the hatchway opening in the ship which is most of all time-consuming, not to mention hazardous when attempted in adverse weather conditions. Moreover, container cargo trucks, either the conventional "side loaders" or "front loaders" are also needed to transport the cargo from the ground storage area to the harbor crane operating area. A harbor crane must operate over substantially the entire length of the main deck, and therefore, the side of the cargo ship must be positioned adjacent a relatively large portion of the dock. The dock space required further increases costs in view of the resulting harbor back-up which forces waiting ships to pay added harbor use charges. Since harbor crane systems do require substantial docking facilities, i.e. long enough to accommodate the ship's length and strong enough to bear the weight and movement of the heavy crane machinery, the overall usefulness and availability of the system is limited to relatively large ports.

Vessels equipped with a main deck gantry and crane apparatus suffer cost and structural drawbacks similar to those of the harbor crane systems. The gantry must be capable of traveling, such as on tracks, over the main deck and, therefore, must be a permanent part of the ship's structure. This increases the ship's cost and the operating expense of the system since each ship of the fleet must be comparably equipped and maintained. A cargo transport vehicle is still necessary either to move the cargo directly on and off the vessel or to a dock crane which can load and unload the cargo handled by the gantry crane. In those gantry vessels which are presently constructed to permit the passage of cargo transport vehicles onto the deck, or to some loading area on the vessel, stern entrance ways require special and costly arrangements of the vessel's control and operation facilities and, due to limited stern ballast tank volume, trimming is so restricted that loading and unloading is prohibited except under proper tidal conditions. On the other hand, in vessels which have previously been designed with bow opening, it has been necessary to reduce substantially the deadweight or cargo area of the ship to achieve an acceptable watertight bow structure.

These are other systems presently in use for handling marine cargo where the hold of the ship is divided into horizontal storage compartments extending lengthwise of the vessel. These systems employ either a main hatchway on the deck, extending vertically through each of the lower decks, or an open loading compartment at one end of the ships, for access to the storage compartments. In these horizontal stowage systems, either the loader vehicle must travel into the hold or some type of mechanized conveyor or railway system is required to transport the cargo unit from the pick-up and discharge area to its storage position for loading, and then back again for unloading. It will be seen that even the simplest of such systems is costly to operate and maintain, and furthermore, would reduce the available cargo area.

Thus, a continued need has existed to provide an efficient and economical system for handling containerized cargo without the need for any special port or docking facilities, or expensive on board handling apparatus, and without restriction of work time depending upon tidal or weather conditions.

SUMMARY OF THE INVENTION

The cargo handling system according to the invention provides a most economical method for loading, stowage and unloading of container cargo units. This system uses one or more cargo transport vehicles, such as the loader trucks widely used for ground handling of cargo containers, commonly known as "side loaders" for lateral lifting and "front loaders" for frontal lifting. The transport vehicle used in the system according to the invention, which are preferably side loader trucks, are equipped with an improved collecting means or "spreader" capable of vertical movement for lowering and raising the containers in the hold of a cargo vessel from the main deck. The spreader may be built into a loader vehicle used specially for this system or it may be an auxiliary attachment to a loader vehicle having an ordinary collecting means normally incapable of vertical movement below vehicle level. The spreader according to the invention operates to engage a container in the conventional manner by some standard latching means. The spreader, which is connected to the transport vehicle lift apparatus as by cables, is lifted and lowered with the cargo by winches suitably mounted on the lift apparatus. It has been found that by proper design of the transport vehicle to provide a weight balance to counter the container weight, the spreader with the container may be handled below the creep level of the transport vehicle, i.e. below the point at which the vehicle would normally lose its planar stability as the spreader with cargo is lowered. The spreader according to the invention permits on board use of transport vehicles for direct handling of containers within the ship's hold from the main deck. As such, the transport vehicle can pick up a container from any location in the port, approach the vessel at half ramp, and move on the main deck of the vessel to deposit the container either on the deck or in the hold. Thus, a cargo vessel which can carry one or more spreaders equipped according to the invention is unlimited in its availability to all ports since a harbor crane and additional ground transport vehicles are not required.

The vessel used in the cargo handling system according to the invention has a substantially conventional hull structure of the variety common to cargo vessels, and preferably has a structure common to self-propelled, ocean-going vessels. The stern section is designed and structured to accommodate the quarters for the ship's company, control room operation, an engine and machine room and all other necessary facilities for the overall operation and maintenance of the vessel both underway and in port.

Between the stern and bow sections, the major portion of the ship's hold is divided by bulkhead partitions which extend vertically and transversely into a plurality of vertical storage compartments having hatchway openings on the main deck. The hatches are covered by specially adapted pontoon covers which keep the storage compartments watertight and which form a suitable roadway and operating surface for cargo transport vehicles on the main deck. Moreover, the pontoon covers have sufficient strength and stability to support not only the cargo loader vehicles, but also additional containers, or other cargo, which may be stacked on the pontoon covers to maximize the total cargo area of the vessel. Depending upon the shape and size of the vessel, the main deck area may comprise any number and arrangement of single, double or triple cell storage compartments enclosed by covers of corresponding sizes. It will be seen that the size of the cover is limited only by the strength and support requirements for the main deck.

The bow section of the ship has a forecastle entrance way and an extendable ramp to permit the loader vehicles to travel between the dock, or other loading area, and the main deck. The entrance may be structured as a forecastle visor in the upper bow portion such that the visor opens to form, in cooperation with the ramp, a tunnel and rampway for the cargo transport vehicles. The open visor and extended ramp must provide adequate clearance for passage of a loader carrying a container to the main deck. Moreover, the rampway in the stowed position is so designed to avoid any interference with visibility from the bridge. The ramp may be structured in folding parts, connected by hinges to each other and at one end to the main deck, which extend to form a rampway between the main deck and the dock or loading area.

While in the closed postion the visor is part of the non-continuous, but nevertheless watertight, forecastle structure. The lower edge of the visor, due to the overall design of the vessel according to the invention, may be situated well above the "minimum bow freeboard" or minimum bow waterline height, i.e. the highest hull level to which the vessel may sink under full load. In prior ships equipped with a bow visor, it has been necessary to limit substantially the cargo area of the vessel in order to satisfy the strict regulations governing the minimum bow freeboard for vessels having a non-continuous forecastle. However, since the loader vehicles used in the system according to the invention need operate only from the main deck, the bow opening can be suitably arranged in the forecastle well above the minimum bow freeboard, thereby satisfying buoyancy regulations and permitting substantially greater cargo tonnage and area than previous non-continous forecastle vessels.

The higher position of the entry way opening in the forecastle further allows for increased ballast tank volume in the lower bow portion, which together with the remaining ballast tanks on the vessel, provides greater maneuverability in controlling the list and trim angles of the vessel during the loading and unloading operations, particularly under severe tides, in poor weather and when the cargo weight of the various containers is radically uneven.

With regard to trimming, in previous vessels having a bow or stern opening, variations of only about 3-4 feet in the height of the vessel to the waterline were possible due to the limited ballast tank volume available in the immediate rampway area. The inability to further control the ship's height, and thereby the grade of the rampway to the docking area, limited the loading and unloading time to proper tide conditions. It is well-known that for container transport vehicles the rampway grade should not exceed about 12-14% to avoid vehicle slippage on the rampway and to prevent touching and scrapping of the loader vehicle or container cargo at the points where the ramp meets the deck and the dock. With a vessel according to the invention, the angle between the ramp and dock area can be controlled to approximately 10-12 feet variations, thereby proportionally controlling the ramp grade to allow adequately for the most severe tidal changes, such as in Persian Gulf ports, thus eventually eliminating previous work stoppages due to tide changes.

Moreover, by locating the entrance way for the transport vehicles in the bow, the disadvantages of stern entry, such as tunneling through the ship's quarters and engine and control compartments, and possible rudder and propeller damage caused by collision with the dock structure or harbor bottom are avoided.

In loading an empty vessel according to the cargo handling system of the present invention, the bow is positioned directly perpendicular into the dock, or alternatively, perpendicular to the loading platform of another vessel or barge. The forecastle visor is then opened and the stowed rampway is extended into position on the docking area. A cargo transport vehicle having a spreader according to the invention, which vehicle has either been carried on the vessel, or which has entered the vessel over the rampway from shore, is used to remove a pontoon cover from any storage hatchway on the main deck, but preferably and for maximum efficiency, from a corner hatchway. The spreader and the pontoon covers, as well as the containers, are provided with any conventional locking or latching system so that the spreader can engage and collect both the covers and containers in a like manner and, further, so that the containers may be locked to each other and to the pontoon covers for stability in storage.

The removed pontoon cover is placed out of the way on top of an adjacent or nearby cover. The loader is then driven over the remaining pontoon covers, down the rampway and off the vessel to collect a cargo container in the normal fashion. The loader thereafter returns to the side of the open hatchway on the main deck and the spreader carrying the container is lowered, as by winch cables operated preferably by remote control from the cab of the loader vehicle, into the empty storage compartment. The container is disengaged at the bottom of the compartment and the spreader is hoisted back into position on the loader vehicle for movement off the vessel to repeat the step until the compartment is filled. At that time, the removed pontoon cover is replaced to close the hatchway of the full compartment and the spreader is used to remove the next cover. The entire procedure is thereafter continually repeated until each compartment is filled and the last pontoon cover is replaced.

The deck of the vessel may also be loaded with containers or other cargo. To ensure the stability of the containers on the deck, the latching system, as previously stated, is used to lock the containers to the upper surface of the pontoon covers and to each other when stacked. It will be seen that when the deck is fully loaded, at least one container, for example, one in the center of the first row of compartments nearest the bow section, must be placed on a cart, or some other suitable means to pull the container off the vessel as an initial step and permit the loader vehicle to move into position to begin the fully automated unloading operation using the spreader.

The unloading of the vessel according to the invention may be conducted simultaneously with the reloading operation as is usually the custom to expedite the entire procedure. Where a vessel is fully loaded and carries a loader vehicle with a container on the main deck, the loader initially unloads the container it carried during transport and then returns to remove the container or containers stored on the wheels on the deck in the first row to permit further unloading using the spreader as previously indicated. The containers loaded on the deck may be entirely removed before the hold is unloaded or the deck and hold may further be unloaded and loaded simultaneously. If only a portion of the deck cargo is cleared, two adjacent pontoon covers, preferably the first two from the outer lane, are removed. The loader is then used to empty the first compartment or first cell of a double or triple compartment, and the reloading process does not begin until the first cell or compartment is empty. Once an empty compartment or cell is available, the loader on its next return trip collects the first new container to be loaded, stows it at the bottom in the empty compartment or cell, and the reloading process commences. The loader then carries containers off and on and the system of simultaneously unloading and loading continues until the vessel is completely reloaded with the new cargo.

It will be realized that in the operation of the loader on board the vessel, many of the conventional movements of such vehicles will be required. Depending on the size of the loader, its wheels will travel either on a single pontoon cover "lane" or on a "lane" two covers wide. It will be apparent that where a loader travels over a two-cover lane, the method of loading and unloading will very to some extent since more deck space is required by the loader to handle containers either on the deck or in the hold. Nevertheless, the method will not depart in any substantial way from the scope of the invention.

In summary, since the system for handling containerized cargo according to the invention is not dependent upon any special type of port or docking facility, it may be used both for line fleets as well as for voyages to new and undeveloped ports having minimal docking facilities. As for those ports which are over-crowded, the minimum dock space used by the present system, and the lack of dependence on any harbor crane or equipment, afford a significant economic advantage over present container and non-container systems.

The novel features and advantages of the cargo handling system, the vessel, and the transport vehicle according to the invention will become more fully evident from the accompanying drawings as explained below, and from the description of the preferred embodiments shown in the drawings which follows immediately thereafter.

BRIEF DESCRIPTION OF THE DRAWINGS

FIG. 6 is a fragmentary plan view of a portion of the main deck showing a pontoon cover for a double cell storage compartment of the vessel as shown in FIG. 1;

FIG. 7 is an enlarged, fragmentary, cross-sectional view of the pontoon cover shown in FIG. 6 taken along lines 7—7 with a cargo container stacked on top;

DESCRIPTION OF THE PREFERRED EMBODIMENTS

Figure 1:
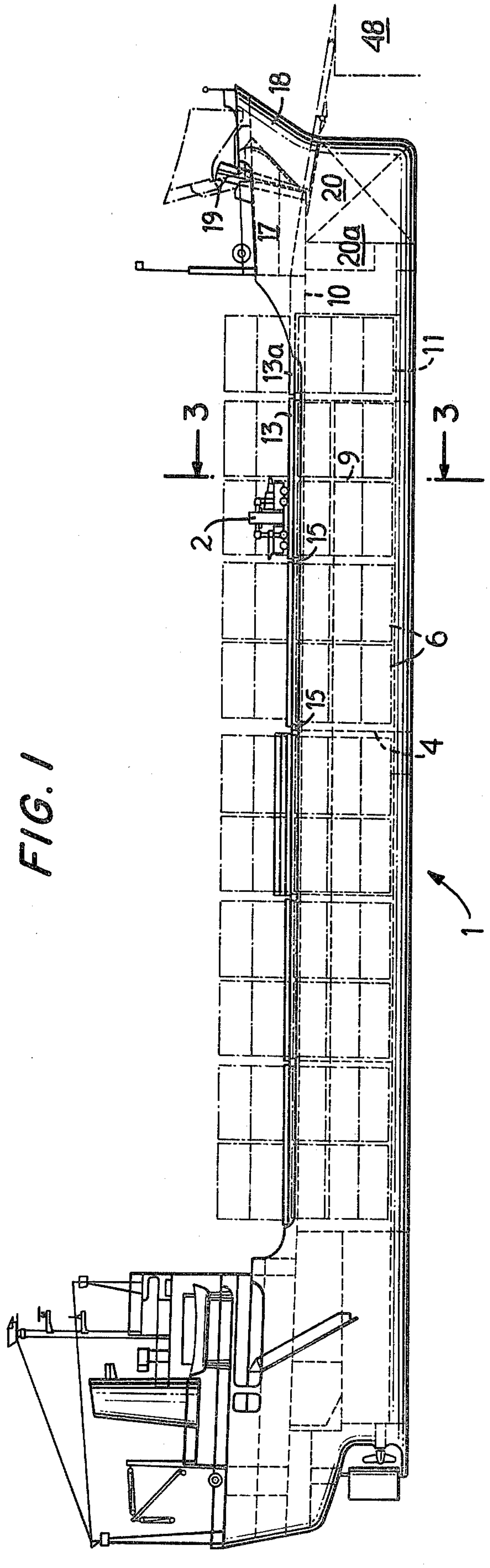
FIG. 1 is an elevational side view of a vessel according to the invention which is in the process of being simultaneously loaded and unloaded from both the deck and hold.
Figure 2:
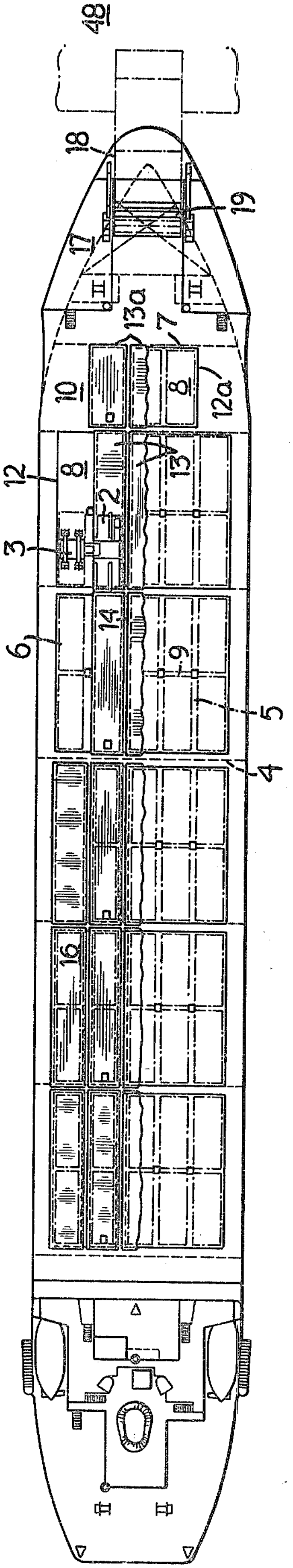
FIG. 2 is a plan view of the vessel shown in FIG. 1.
Figure 3:
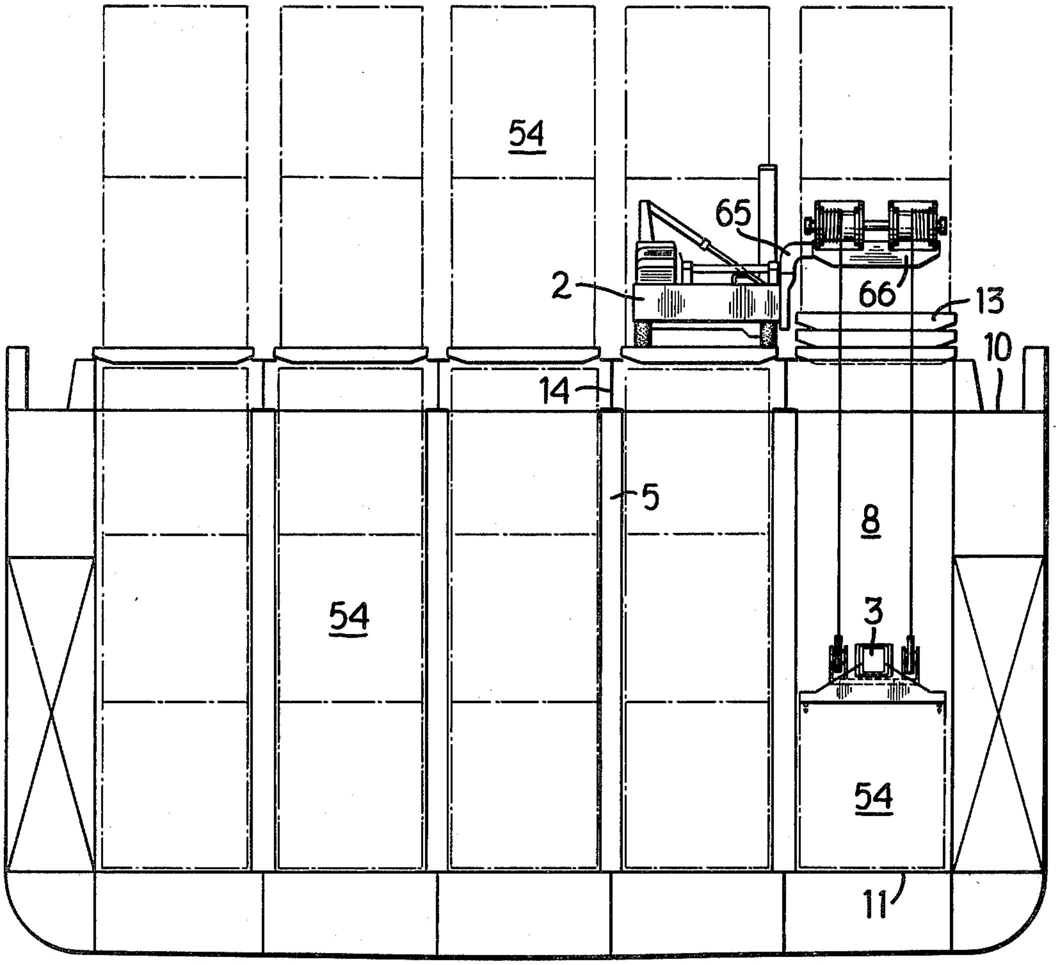
FIG. 3 is a simplified cross-sectional view of the vessel shown in FIG. 1 taken along lines 3—3.

With reference to the accompanying drawings, in which the same numerical designations are intended to correspond to the same or substantially similar parts, the system for loading and unloading containerized cargo according to the invention utilizes a specially constructed vessel 1 and a cargo transport vehicle 2, as shown in FIGS. 1-3. The cargo transport vehicle 2, which is preferably a conventional side loader, has a novel cable-operated collecting means 3 or "spreader" which is shown in more particular detail in FIGS. 8 and 9.

The stern section in the vessel 1, as best seen in FIGS. 1 and 2, is provided with suitable rooms for the operation, control and maintenance of the vessel and its engines, quarters for the crew and other facilities normally found in self-propelled, ocean-going ships. Since the control and operation features of the vessel do not in any way form a part of the invention, the stern section is merely shown as arranged in the conventional manner and is not further described.

Between the stern and bow sections, the major portion of the vessel's hull is structured as a cargo hold which is divided by vertical bulkhead partitions 4 and traverse bulkhead partitions 5 to form a plurality of watertight double-cell storage compartments 6 and single-cell storage compartments 7 having cells 8. The two cells 8 of the double-cell storage compartments 6 are divided by smaller vertical bulkhead partitions 9.

The compartments 6 and 7 extend downwardly from the main deck 10 to the bottom 11 of the vessel's hold. The double storage compartments 6 and single storage compartments 7 are open on the main deck 10 to form hatchways 12 and 12*a*, respectively, for access to the storage cells 8. The double compartment hatchways 12 and single compartment hatchways 12*a* are normally covered by pontoon covers 13 and 13*a*, respectively, which are supported longitudinally by continuous "I" girders 14 (FIG. 3) and laterally by beams 15 (FIG. 1). The respective storage compartments 6 and 7 and the pontoon covers 13 and 13*a* are spaced appropriately to provide an adequate roadway and operating surface 16 on the main deck 10 for the transport vehicle 2.

Figure 4:
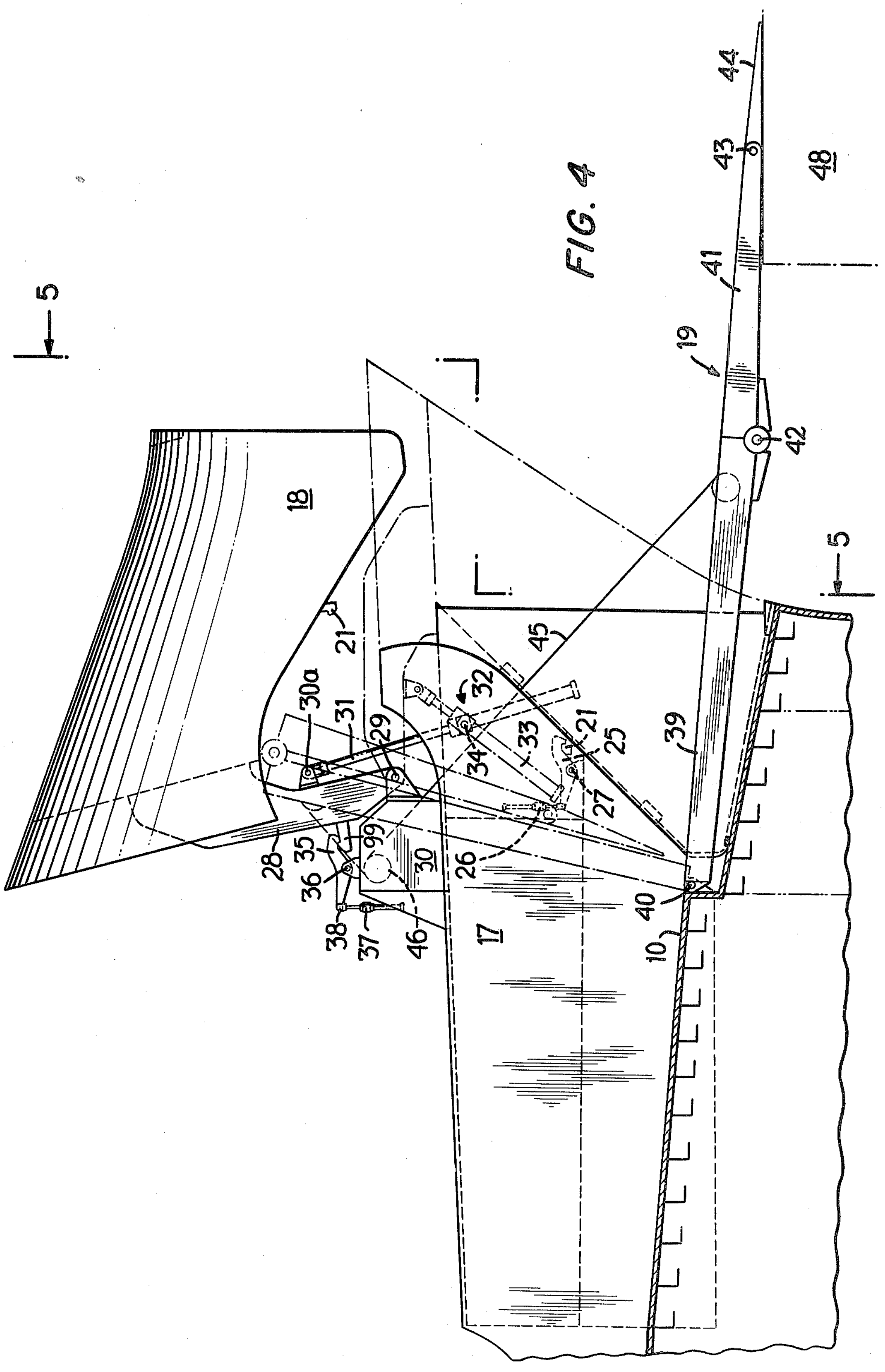
FIG. 4 is a fragmentary, elevational side view of the forecastle structure of the vessel shown in FIG. 1.
Figure 5:
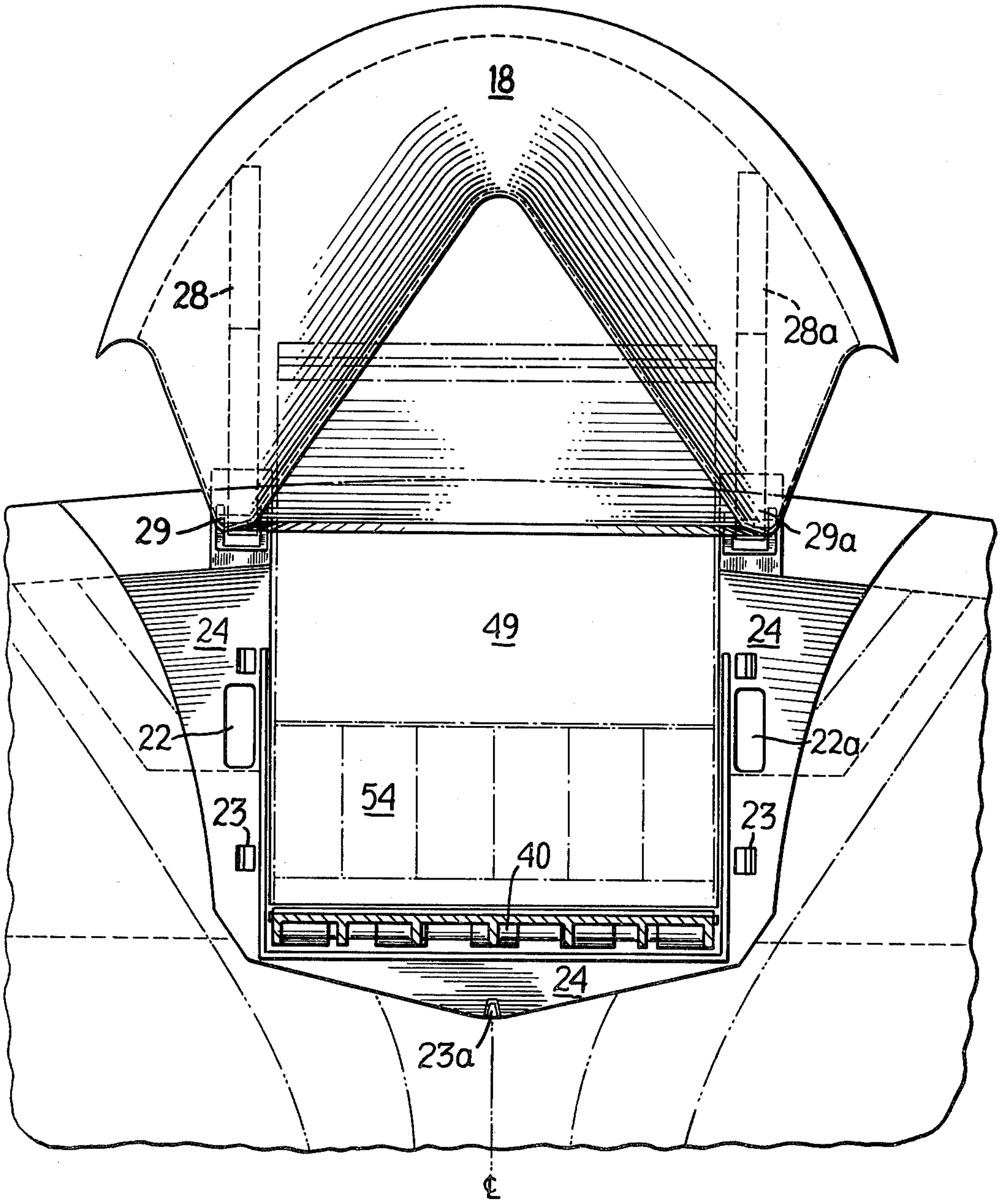
FIG. 5 is a cross-sectional view of the fragment of the forecastle structure as shown in FIG. 4 taken along lines 5—5.

The bow section of the vessel 1 comprises a forecastle 17, a visor 18 within the forecastle structure, an extendable and retractable ramp 19, and ballast tanks 20. As best seen in FIGS. 4 and 5, the visor 18 in the closed position is secured to the hull by cleats 21 and 21*a* (not shown) which pass through the corresponding openings 22 and 22*a* in the gasket 24 and engage complimentary holding grips 25 and 25*a* (not shown). The gasket 24 provides a watertight seal between the visor 18 and the remaining portion of the forecastle 17, which is further provided at its open edges with a plurality of side lugs 23 and a central lug 23*a* which protrude through the gasket 24 to engage corresponding guide cavities in the visor to ensure proper, watertight closure. The cleats 21 and 21*a* and grips 25 and 25*a* are disengaged, such as by activating piston-operated release mechanisms 26 and 26*a* (not shown) to rotate the grips 25 and 25*a* about the corresponding pivots 27 and 27*a*. The visor arm members 28 and 28*a* are integrally connected to the visor 18 and are pivotally connected at 29 and 29*a* to a mounting block 30 fixed to the forecastle 17. The arms 28 and 28*a* are pivotally connected at 30*a* and 30*b* (not shown) to piston rods 31 and 31*a* (not shown) of corresponding hydraulic piston assemblies 32 and 32*a* (not shown). The piston cylinders 33 and 33*a* (not shown) are pivotally connected to the forecastle 17 at 34 and 34*a* (not shown). Accordingly, by operation of the piston assemblies 32 and 32*a*, the visor 18, once the cleats 21 and 21*a* are released from grips 25 and 25*a*, is hydraulically lifted to the fully opened position as seen in FIGS. 4 and 5. The visor 18 is held in the open position by engagement of cleats 99 and 99*a* (not shown) with the corresponding shaped holding grips 35 and 35*a* (not shown) which are pivotally mounted on the blcok 30 at 36 and 36*a* and pivotally connected to the release mechanisms 37 and 37*a* (not shown) at pivot points 38 and 38*a*.

The ramp 19 is divided into three parts, a first part 39 secured by hinge 40 to the main deck 10; a second part 41 attached by hinge 42 to part 39 and by hinge 43 to a third part or lip 44. The ramp 19 is held in the upright or retracted position by connection of cable 45 to the winch 46 and ramp part 39. The winch 46, through the cable 45, operates conventionally to lower and raise the ramp. The ramp part 41 is manually guided into position on the dock 48 as is the lip 44.

As best seen in FIG. 5, the fully opened visor 18 and extended ramp 19 form a tunnel and passageway 49 with the remaining forecastle structure so that the loader vehicle 2 can be driven over the rampway 19 onto the main deck 10 for handling cargo containers according to the invention.

The pontoon covers 13 and 13*a* differ only in size and not construction. Referring to FIGS. 6 and 7, the frame a double-cell compartment pontoon cover 13 comprises a top 47, sides 49 and 50 and ends 51 and 52 and has several lateral and transverse interior structural supports 53 to provide adequate strength for the cover 13 to bear the weight of the cargo loader vehicle 2 and a stack of about three containers 54. The perimeter 55 formed by the open underside of the cover 13 is provided with a gasket 56 having a centrally located notch 57 positioned and shaped to engage a complimentary guide lug 58 which surrounds the hatchway 12 and is integral with and protrudes from the "I" girder supports 14 on either side and the beams 15 on the ends of the hatchway 12, thereby to obtain a watertight seal. The pontoon covers 13 and 13*a* across the main deck 10 are suitably spaced and locked to the main deck to provide a roadway and operating surface for the cargo loader vehicle 2.

As seen in FIG. 6, the top surface 47 of the pontoon cover 13 is provided with a plurality of reinforced, apertured catches 60 while the bottom surface of the container 54 is correspondingly provided with corner latch prongs 61. Similarly, the top of the container 54 is provided with apertured catches 60 in each corner. The catches 60 and prongs 61 are suitably designed according to any standard latching system 62 such that the prongs 61 may be inserted into the catch aperture 63 and thereafter rotated to lock containers 54 of various sizes to the upper surface 47 of the pontoon covers 13 or to the top of other containers. In FIG. 6, the upper surface 47 of cover 13 is provided with catches 60 to receive two smaller containers as indicated by the two smaller "X" shaped area markings or a single large containers as indicated by the single large "X" shaped area marking. As such, containers may be stacked and locked one on top of another either in the hold or on the deck as seen in FIGS. 1 and 3. Moreover, the same type of prongs 61 and latching system 62 is provided on the spreader 3 of the transport vehicle 2 to handle the covers 13 as well as the containers 54 in a known way, as will be shown in the discussion of FIGS. 8–12 which follows.

Figure 8:
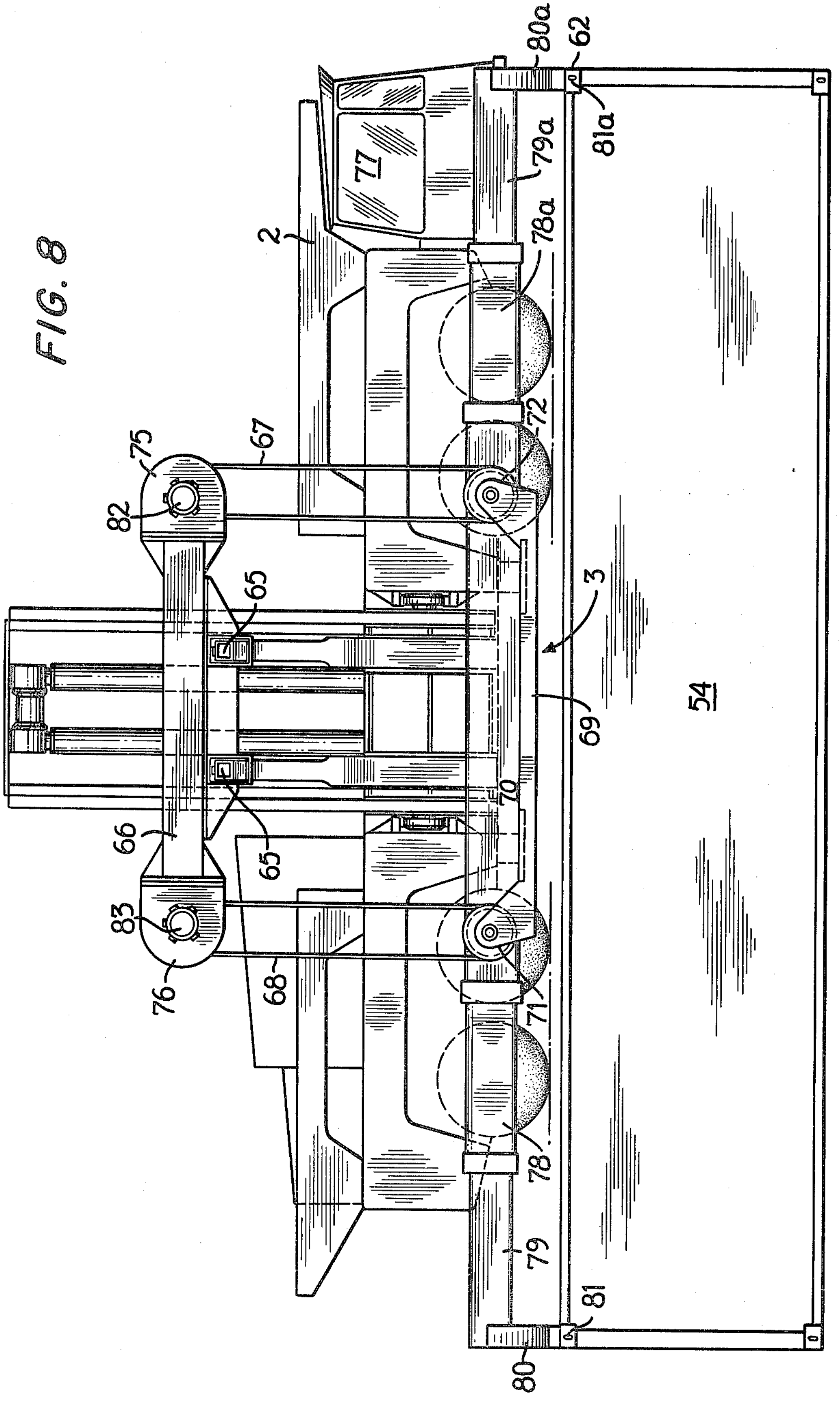
FIG. 8 is a schematic side view of a cable-operated collecting means according to the invention.
Figure 9:
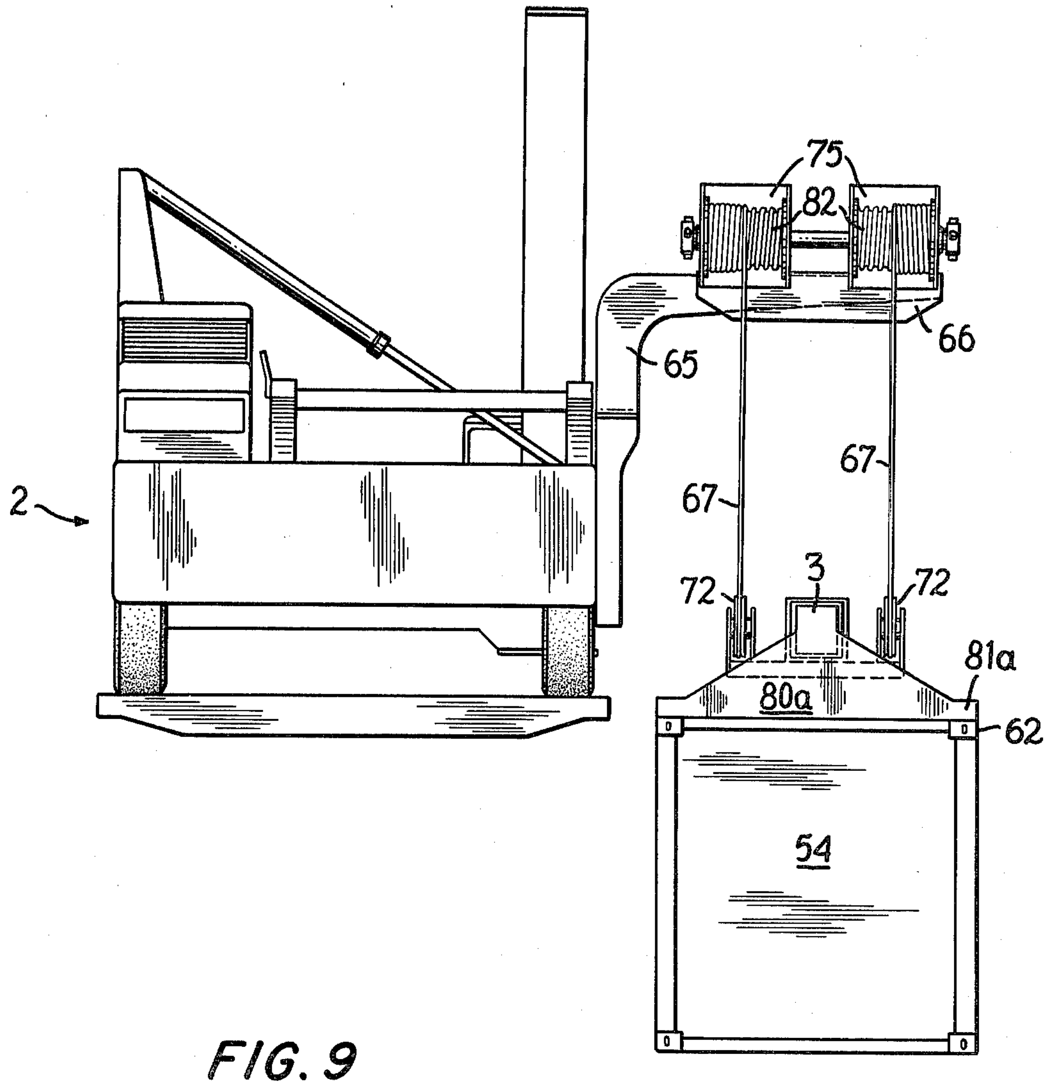
FIG. 9 is an end view of the collecting means shown in FIG. 8 showing its operation for lowering a container into a storage cell, as further shown in FIG. 3.

A preferred embodiment of the improved transport vehicle collecting means according to the invention is shown in FIGS. 8 and 9. The cargo transport vehicle 2, here a side loader, is normally provided with double lifting prongs 65. A rigid support beam 66 is mounted securely to the prongs 65 in proper balance to support the collecting means or spreader 3. Cables 67 and 68 are connected to the cradle support 69 on the central housing member 70 of the spreader 3 by means of pulleys 71 and 72. The cables 67 and 68 are threaded through pulleys 71 and 72, respectively, and are attached to and operated by the winches 75 and 76 mounted at opposite ends of the beam 66. The winches 75 and 76 are remotely controlled from the cab 77 of the loader vehicle 2. The spreader 3 may be constructed telescopically, such that the counterpart inner extension members 78 and 78*a* and outer extension members 79 and 79*a*, normally retained in the central housing 70, may be telescoped to vary the width defined by the collecting arms 80 and 80*a* fixed to the ends of the outer extension members 79 and 79*a*, respectively, to collect and handle containers of different sizes. It will be seen that the respective corner edges 81 and 81*a* of the collecting arms 80 and 80*a* on their undersides are provided with prongs 61 for use in a standard latching system 62 as employed in the invention.

By means of the winches 75 and 76, the loader vehicle 2 on the main deck may be used to lower and raise the spreader 3, with or without a container, in the hold of the vessel. This apparatus has the capability of effecting a considerable path-lift below the creep level of the loader itself. As can be seen in FIG. 9, the spreader 3 has collected a container 54 which is being lowered below the main deck surface on which the loader 2 is situated. To insure that the cables 67 and 68 are in a correctly centered position, the respective winding drums 82 and 83 of the winches 75 and 76 are provided with a spiral type grooving, as seen in FIG. 9.

Figure 11:
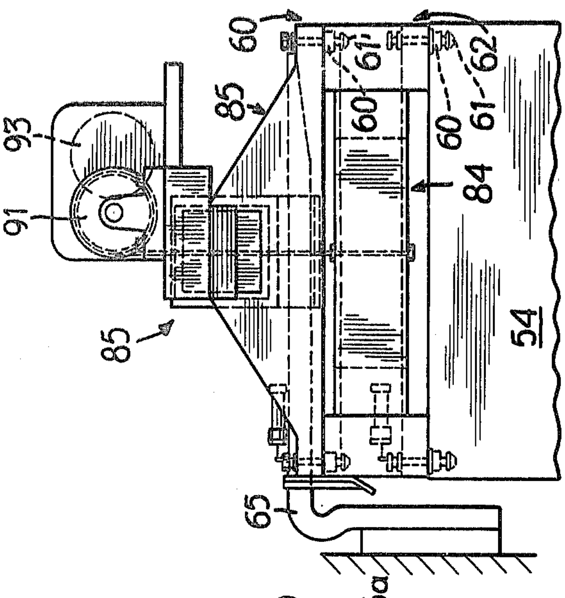
FIG. 11 is an end view of the auxiliary collecting means shown in FIG. 10.
Figure 10:
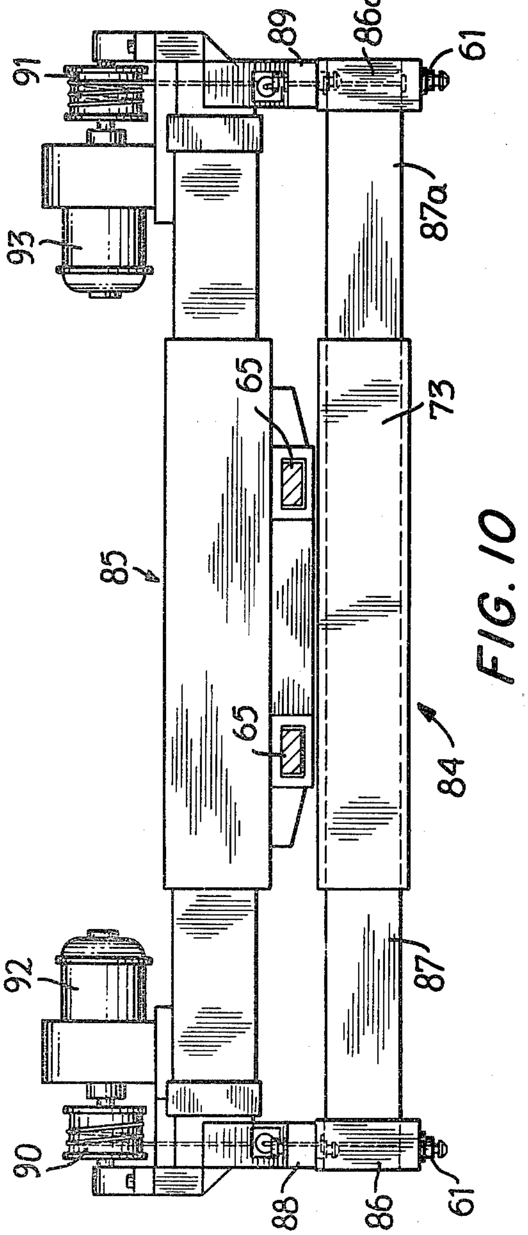
FIG. 10 is a schematical side view of an auxiliary collecting means according to the invention for use as an attachment onto a conventional collecting means of a side loader vehicle.
Figure 12:
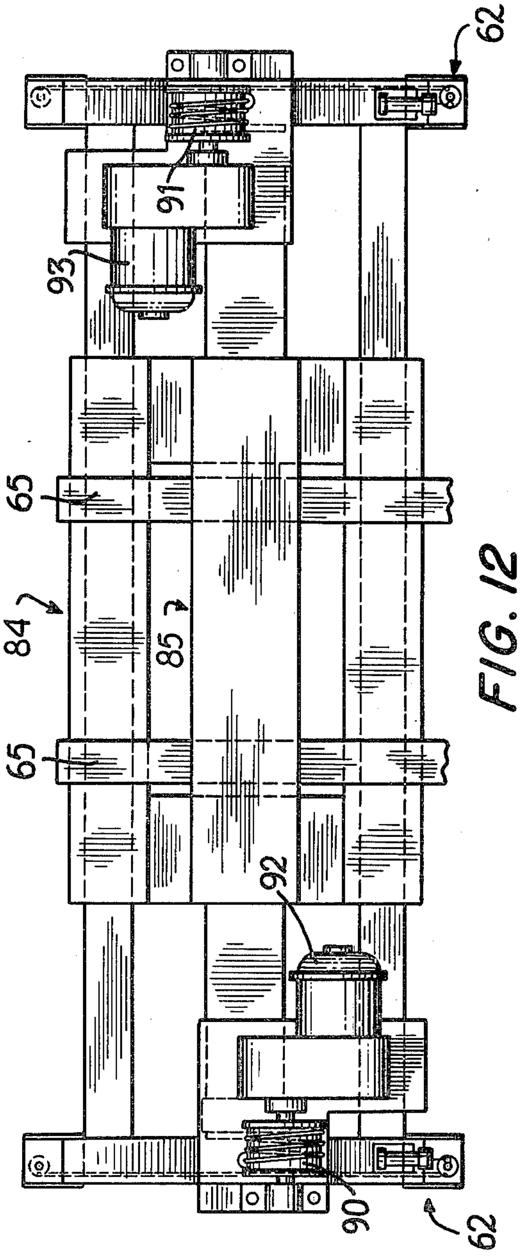
FIG. 12 is a plan view of the auxiliary collecting means shown in FIG. 10.

In FIGS. 10–12 the improved collecting means according to the invention is shown as an auxiliary spreader 84 which can be attached beneath the standard collecting means 85 of a conventional cargo transport vehicle. As customary, the standard collecting means 85 is constructed telescopically for collecting containers of various sizes and, conformably, the auxiliary spreader 84 is also telescopically constructed.

More precisely, auxiliary spreader 84 comprises a central housing 73 and counterpart extension members 87 and 87*a* for telescopic extendability of the spreader, as seen in FIG. 12. The collecting arms 86 and 86*a* of the extension members 87 and 87*a* of the spreader 84 have catches 60 on their upper surfaces and prongs 61 on their bottom surfaces. The catches 60 permit the prongs 61 of the collecting means 85, by the usual latching system 62, to engage the top of the auxiliary spreader 84 and both pieces move cooperatively when operating in the conventional mode. In turn, the spreader 84 through the prongs 61 on the undersides of the collecting arms 86 and 86*a* act to collect the container 54 or a pontoon cover 13. In essence, spreader 84 functions as an intermediate collecting means, substituting for the standard collecting means 85, but with the added capability of being lowered or raised together with container 54. In order to provide for the vertical movement of the spreader 84, the frame of the spreader 84 is further bilaterally hung on the adjacent collecting means 85 by means of cables 88 and 89 which are wound onto the respective drums 90 and 91 of winches 92 and 93 mounted on the upper surface of the frame of the standard collecting means 85. Winches 92 and 93 are similar to winches 75 and 76, shown in FIGS. 8 and 9, in structure and operation.

In order to ensure the correct positioning of the frame of spreader 84 with the frame of the original collecting means 85 at the completion of the path-lift, both collecting means may be reciprocally provided with appropriate raising and guiding elements.

It will be appreciated that the embodiment of the spreader according to the invention as shown in FIGS. 8 and 9 is a four-way winch and cable system. As such, this embodiment is preferred since it permits, through four separate winches, additional manuverability of the position of the container itself, which is particularly useful in aligning the container with the hatchways.

In operation of the cargo handling system according to the invention, a vessel 1 as seen in FIG. 1, is positioned with its bow section directly into a cargo landing area or dock 48. The bow visor 18 is then opened by disengaging cleats 21 and 21*a* from holding grips 25 and 25*a* through operation of the release mechanisms 26 and 26*a*. The piston assemblies 32 and 32*a* are then activated to move the respective piston rods 31 and 31*a* upward, thereby rotating the visor 18 about points 29 and 29*a* until fully opened. The bow visor 18 is held in the fully opened position by locking cleats 99 and 99 to the holding grips 35 and 35*a* on the forecastle block 30.

After the bow visor 18 has been opened, or simultaneously with opening the visor 18, the winches 46 and 46*a* are operated to lower 99*a* extend the first ramp part 39. As the first part 39 is moved, the second part 41 and the lip 44 are guided manually until the ramp is fully extended to the dock 48 forming a rampway between the dock 48 and the main deck 10.

Assuming that the vessel 1 contains a full load of container cargo both in the hold and on the deck, the vessel may be simultaneously unloaded and reloaded with new cargo as follows: the side loader vehicle 2 is used initially to remove the containers 54 from the top of the pontoon covers 13*a* and the center pontoon cover 13 in the first row of the vessel as seen in FIG. 2. These containers are preferably on wheeled carts for ease of removal such that the loader 2 can simply hook onto the cart and pull it away. The loader 2 is then used to collect and remove containers from a corner area of the ship's deck 10 to enable the loader 2 to be maneuvered as further seen in FIG. 2. Once a portion of the deck 10 has been cleared, two adjacent pontoon covers 13 from the cleared end of the outermost storage compartment lane are moved and placed atop the next in-line pontoon cover from which the deck containers have already been removed. The loader 2 is then moved on and off the vessel to empty one cell 8 of the first compartment 6. When the first cell 8 has been emptied, the loader 2 on its next return trip begins to collect new cargo from shore for loading the empty cell 8. The process of unloading and loading containers, preferably leaving the unloading and reloading of the single storage compartments 7 for last, until the hold and deck are completely reloaded.

During the unloading and loading process, the list and trim angles of the vessel and, consequently, the stability and angle of the rampway, are controlled primarily by the water ballast tanks 20 in the bow of the vessel by means of pumps 20*a*.

Once the vessel has been completely reloaded, the ramp 19 is retracted by reversing the winches 46 and 46*a* to rewind the cable 45. The bow visor cleats 99 and 99 are are disengaged from the holding grips 35 and 35*a* and the visor 18 is lowered by operation of the piston assemblies 32 and 32*a* until the cleats 21 and 21*a* are again locked into the closed position by grips 25 and 25*a*. The vessel is then otherwise readied for voyage in the usual manner.

While the invention has been particularly described with respect to several specific and preferred embodiments, it will be apparent to those skilled in the art that the principles embodied in this invention encompass many other embodiments as defined by the scope of the following claims:

I claim:

1. Apparatus for handling container cargo for marine transportation comprising:

a cargo vessel having an uppermost deck over a cargo hold area, a plurality of vertical storage compartments extending from the uppermost deck into the hold and a bow entrance way situated in the forecastle structure above the minimum bow freeboard, said storage compartments having hatchways on the uppermost deck provided with removable covers that form a suitable operating surface, and a ramp being provided for connecting the entrance way to a dock, and a transport vehicle capable of unrestricted movement in all directions both on the dock and on the operating surface provided by the uppermost deck and the removable hatchway covers, said transport vehicle having a collecting means for collecting container cargo, stacking container cargo on top of each other on the support surface on which it travels, and raising and lowering container cargo below the support surface on which it travels, said transport vehicle being adapted to travel from the dock onto the uppermost deck of the vessel by means of the ramp and entrance way so as to allow for direct cargo handling, including lowering and raising container cargo vertically into and out of said vertical storage compartments from the uppermost deck and stacking container cargo on top of each other on the hatchway covers.

2. Apparatus according to claim 1 wherein the transport vehicle is a side loader.

3. Apparatus according to claim 1 wherein the means on the transport vehicle for collecting, lowering and raising the container cargo is cable-operated.

4. Apparatus according to claim 1 wherein the entrance way comprises a visor within the forecastle structure, rotatably fixed to the bow, which opens to form, in cooperation with said ramp, a tunnel and passageway from the uppermost deck to the dock.

5. Apparatus according to claim 4 wherein the visor is watertight in the closed position.

6. A self-propelled container cargo vessel comprising a stern section for the operation and maintenance of the vessel, a bow section having an entrance way situated in the forecastle structure for passage of cargo transport vehicles onto an uppermost deck located above a cargo hold area of the ship, and vertical storage compartments extending from the uppermost deck into the hold between the bow and stern sections, the entrance way being above the minimum bow freeboard, said storage compartments having hatchways on the uppermost deck provided with removable covers that form a suitable operating surface with the rest of the uppermost deck to permit movement of the transport vehicles in all directions on that surface, said bow section including an extendable and retractable ramp for connecting the entrance way to a dock.

7. A vessel according to claim 6 wherein the entrance way comprises a visor within the forecastle structure rotatably fixed to the bow which opens and cooperates with a ramp to form a tunnel and passage way from the uppermost deck forward of the hold to a dock.

* * * * *

UNITED STATES PATENT AND TRADEMARK OFFICE
CERTIFICATE OF CORRECTION

PATENT NO. : 4,158,416

DATED : June 19, 1979

INVENTOR(S) : Sergio Podesta

It is certified that error appears in the above-identified patent and that said Letters Patent are hereby corrected as shown below:

First page, Item [30], "1264 A/75" should read -- 12624 A/75 --;

Col. 2, line 6, "These" should read -- There --.

Col. 5, line 51, "very" should read -- vary --.

Col. 7, line 21, "complimentary" should read -- complementary --;

line 48, "blcok" should read -- block --;

line 68, before "a" insert -- of --.

Col. 8, line 8, "complimentary" should read -- complementary --;

line 32, "containers" should read -- container --.

Col. 9, line 54, "manuverability" should read -- maneuverability --;

UNITED STATES PATENT AND TRADEMARK OFFICE

CERTIFICATE OF CORRECTION

PATENT NO. : 4,158,416

DATED : June 19, 1979

INVENTOR(S) : Sergio Podesta

It is certified that error appears in the above-identified patent and that said Letters Patent are hereby corrected as shown below:

Col. 9, line 67, "99" (second occurrence) should read -- 99a --;

Col. 10, line 3, "99a" should read -- and --;

line 32, after "last," insert -- continues --;

line 42, "are" (first occurrence) should read -- a --.

Signed and Sealed this

*Second* Day of *October 1979*

[SEAL]

*Attest:*

LUTRELLE F. PARKER

RUTH C. MASON
*Attesting Officer*

*Acting Commissioner of Patents and Trademarks*